Patented Dec. 6, 1949

2,490,270

UNITED STATES PATENT OFFICE 2,490,270

RESINS FROM THIOPHENE AND TURPENTINE

George C. Johnson, Woodbury, N. J., assignor to Socony-Vacuum Oil Company, Incorporated, a corporation of New York No Drawing. Application May 8, 1946, Serial No. 668,322

10 Claims. (Cl. 260—79.7)

The present invention relates to the preparation of resinous and sub-resinous bodies from thiophene or alkyl derivatives of thiophene having at least two replaceable nuclear hydrogens and hydrocarbons having two conjugated or non-conjugated double bonds or hydrocarbons having one double bond and one four-membered ring, and more particularly, to the preparation of resinous and sub-resinous bodies from thiophene or the aforedescribed thiophene derivatives and turpentine or terpenes having the formula $C_{10}H_{16}$.

Thiophene and alkyl derivatives thereof having at least two replaceable nuclear hydrogens react with terpenes, turpentine butadiene, cyclopentadiene and, in general, hydrocarbons having two conjugated or non-conjugated double bonds or hydrocarbons having one double bond and one four-membered carbocyclic ring in the presence of boron trifluoride, boron trifluoride complexes and "Friedel-Crafts" type catalysts, i. e. boron trichloride, aluminum trichloride or tribromide, titanium tetrachloride, stannous chloride, zinc chloride and ferric chloride, etc. to form resinous bodies and sub-resinous bodies of the nature of viscous oils. These products can be used as adhesives, as the film-forming component of varnishes, as laminating agents, as components of lubricating oils, and the like. The products are characterized by a sulfur content ranging from about 2 per cent to about 15 per cent by weight. [Thiophene ($C_4H_4S$) has a sulfur content of about 38.1 per cent by weight.]

It was noted hereinbefore that among the catalysts for this reaction are the boron trifluoride complexes. As is well known to those skilled in the art, the complexes formed with boron trifluoride (BF$_3$) include the hydrates, $BF_3(H_2O)_n$ where $n$ is not more than 1.5; the etherates represented by the general formula $ROR'(BF_3)_n$ wherein R and R' are the same or different organic radicals; examples of such etherates are the boron trifluoride complexes of dimethyl ether, diethyl ether, methyl amyl ether, methyl phenyl ether, ethyl phenyl ether, etc.; the complexes of acid halides and boron trifluoride, represented by the general formula $RCOX(BF_3)_n$, wherein R is an organic radical and X is a halogen atom, of these complexes that of acetyl chloride is typical; the ester complexes represented by the formula $RCOOR'(BF_3)_n$ wherein R and R' are the same or different organic radicals and are illustrated by ethyl acetate; and complexes of alcohols such as methyl and ethyl alcohols and represented by the type formula $ROH(BF_3)_n$. Of the complexes enumerated the hydrates of boron trifluoride containing about one mole of water for each molecule of boron trifluoride are preferred.

Accordingly, the present invention has as an object the preparation of sub-resinous and resinous bodies from thiophene or thiophene derivatives having at least two replaceable nuclear hydrogens and hydrocarbons having two conjugated or non-conjugated double bonds or hydrocarbons having one double bond and one four-membered ring, or terpenes in the presence of a catalyst. The present invention has as another object the preparation of sub-resinous and resinous bodies from thiophene or thiophene derivatives having at least two replaceable nuclear hydrogens and turpentine in the presence of a catalyst of the Friedel-Crafts type or boron trifluoride or a boron trifluoride complex. It is a further object of the present invention to provide sub-resinous bodies of the nature of viscous oils and resinous bodies obtained by reacting thiophene and/or its derivatives having at least two replaceable nuclear hydrogens with turpentine or terpenes such as alpha-pinene, beta-pinene (nopinene) or limonene in the presence of a catalyst such as boron trifluoride or complexes thereof and Friedel-Crafts type catalysts such as aluminum trichloride, stannous chloride, ferric chloride and titanium tetrachloride. Other objects and advantages will become apparent from the following description.

Briefly stated, the present method of producing sub-resinous, i. e. viscous oils and resinous bodies comprises reacting thiophene and derivatives thereof as described hereinbefore with hydrocarbons of the classes described hereinbefore in the presence of one or more of the catalysts enumerated hereinbefore. It is preferred, however, to carry out the reaction in the presence of a diluent. Thus, for purposes of illustration, thiophene, turpentine, which is a mixture of alpha-pinene, beta-pinene, mono-cyclic terpenes and terpene alcohols, and a diluent are mixed at room temperature and boron trifluoride, for example, added. After the reaction has taken place the boron trifluoride is removed in any suitable manner and by forming a solid compound with ammonia and filtering off the solid compound. The residual liquid is then washed with water, to remove traces of boron trifluoride and ammonia, the washed liquid is dried and the dried liquid distilled under a vacuum. In the distillation the first fraction comprises principally diluent and unreacted materials. The second fraction is a sub-resinous material of the nature of a viscous oil. The still residue is a resin usually somewhat brittle, clear and usually of a brown color. It has been found that the dried liquid distilled to a pot temperature of about 250 degrees centigrade at a pressure of about 5 millimeters of mercury leaves a suitable resinous body as a still residue.

The reaction can be carried out over a wide range of temperatures and pressures, using any of the aforementioned catalysts. However, it is to be noted that all of the catalysts are not equally effective at low temperatures. The data in Tables I and II establish the foregoing.

The data collected in Table I were obtained by reacting thiophene and gum turpentine in a diluent in the presence of boron trifluoride at various temperatures. The thiophene, gum turpentine and diluent were placed in a pressure resistant container and boron trifluoride introduced until the pressure reached about 10 pounds per square inch. Then the excess of boron trifluoride was vented. All variables except temperature were held constant. The softening points listed in Table I and elsewhere were determined by the American Society for Testing Materials ring-and-ball method E2B-42T which is described in A. S. T. M. Standards, Book III, page 2119 (1944).

Table I

| Run No. | Temperature, °C. | Distillation End Point °C. | Distillation End Point mm. Hg | Still Residue gm./mole of Thiophene | Softening Point of Residue, °F. | Per cent S by wt. |
|---|---|---|---|---|---|---|
| 1 | 80 | 250 | 3 | 87.7 | 174 | 10.4 |
| 2 | 20 | 250 | 280 | 210 | | 9.5 |
| 3 | 20 | 250 | 20 | 124 | | |
| 4 | Minus 40 | 250 | 25 | 150 | 174 | |

Catalyst: BF₃.

It will be observed that when boron trifluoride is used as a catalyst the temperature is not critical over the range about minus 40 to about plus 80 degrees centigrade.

Table II

| Run No. | Temperature, °C. | Distillation End Point °C. | Distillation End Point mm. Hg | Still Residue gm./mole of Thiophene | Softening Point of Residue, °F. | Per cent S by wt. |
|---|---|---|---|---|---|---|
| 5 | 80 | 250 | 4 | 76.0 | 190 | |
| 6 | 20 | 250 | 4 | 58.7 | 203 | 2.2 |
| 7 | Minus 40 | ¹171 | 760 | 33.3 | (²) | |

Catalyst: AlCl₃.
¹ Vapor temperature; other distillation temperatures are pot temperatures.
² Sticky liquid.

It will be noted that as the reaction temperature is lowered the yield of still residue decreases when aluminum trichloride is the catalyst. In other words, the yield at low temperatures such as minus 40 degrees centigrade using AlCl₃ as the catalyst is low but the yields at higher temperatures such as plus 20 degrees and higher are satisfactory.

At this point it should be emphasized that while the two turpentines, gum turpentine and wood turpentine, differ somewhat in composition, either may be used. As Palmer disclosed in Ind. Eng. Chem. 34, 1028 (1942) gum turpentine has the following composition:

| | Per cent by weight |
|---|---|
| Alpha-pinene | 58–65 |
| Beta-pinene (nopinene) | 30 |
| Mono-cyclic terpenes | 2 |
| Terpene alcohols | 2 |

On the other hand, wood turpentine has the following composition:

Alpha-pinene_____per cent by weight\_\_ 80
Beta-pinene (nopinene)_____ Trace
Mono-cyclic terpenes\_\_\_per cent by weight\_\_ 15
Terpene alcohols _____do\_\_\_\_ 1.5

The accepted structural formulae of the primary constituents of the two turpentines are:

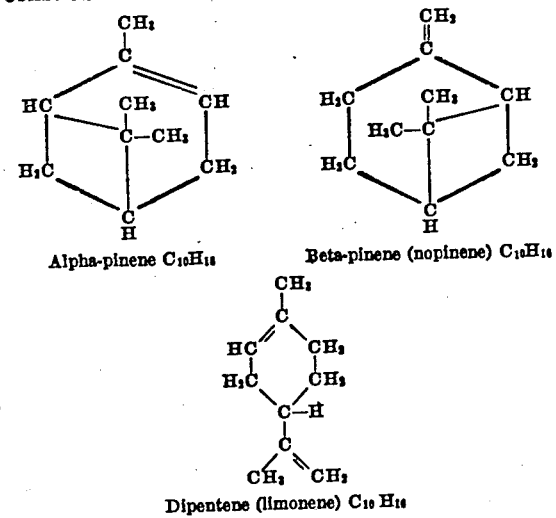

Alpha-pinene C₁₀H₁₆    Beta-pinene (nopinene) C₁₀H₁₆

Dipentene (limonene) C₁₀H₁₆

Gilman states that the pinene derivatives, such as alpha-pinene and myrtenal contain a four-membered ring in addition to the usual six-membered ring [Organic Chemistry, vol. 1 (2nd ed.), page 71].

These constituents of turpentine when reacted alone with thiophene produce sub-resinous to resinous bodies. Thus, when alpha-pinene is used a soft paste rather than a brittle solid characteristic of turpentine is obtained. On the other hand, the reaction product of thiophene and dipentene is a brittle solid. Data on these reactions are presented in Table III.

Table III

| Run No. | Terpene | Distillation End Point °C. | Distillation End Point mm. Hg | Still Residue (gms./mole Thiophene) | Softening Point, °F. | Per Cent S by wt. in Residue |
|---|---|---|---|---|---|---|
| 8 | dipentene | 240 | 5 | 90 | 156 | 11.0 |
| 9 | alpha-pinene | 250 | 4 | 57.8 | soft paste | 7.4 |
| 2 | turpentine | 250 | 250 | 210 | solid | 9.5 |
| 4 | do | 250 | 25 | 150 | 174 | |

When beta-methyl thiophene (3-methyl thiophene) replaces thiophene in the reaction using BF₃ as a catalyst, a solid is obtained as a still residue. This solid contained 5.7 per cent sulfur by weight. When alpha-methyl thiophene replaces thiophene in the reaction using BF₃ as a catalyst, a solid containing 9.9 per cent sulfur is obtained as the still residue. When ditertiary-butyl thiophene replaces thiophene in the reaction, a solid containing 3.3 per cent sulfur is obtained as the still residue.

The thiophene or thiophene derivative (as defined hereinbefore) and the hydrocarbon (as defined hereinbefore) may be reacted over a wide range of ratios. For example, thiophene and turpentine have been reacted in the range of ratios of thiophene to turpentine from 1:2 mols to 3.6:1 with satisfactory results. This is illustrated by the results tabulated in Table IV.

Table IV

| Run No. | Mole Ratio Thiophene to Turpentine | Distillation End Point °C. | Distillation End Point mm.Hg | Still Residue (parts by wt./mole Thiophene) | Softening Point of Residue, °F. | Per Cent S by wt. in Residue |
|---|---|---|---|---|---|---|
| 4 | 1:1 | 250 | 25 | 150 | 174 | |
| 10 | 1:2 | 250 | 2 | 125 | 158 | 12.4 |
| 11 | 2:1 | 250 | 3.5 | 61.8 | 159 | 5.4 |
| 13 | ¹2:1 | 250 | 3 | <163 | 232 | 15.1 |
| 12 | ¹3.6:1 | 250 | 5 | <44 | soft | 5.3 |
| 14 | 1:2 | 240 | 5 | <204 | 174 | 9.4 |

Catalyst: BF₃.
¹ Not comparable as changes other than the ratio of reactants were made.

Various diluents such as n-pentane, cyclohexane and the like can be used and the volume of diluent varied over a wide range. Suitable diluents are saturated aliphatic hydrocarbons such as n-pentane and other solvents which are inert in the presence of the catalyst. For example, the reaction has been carried out in the absence of diluents and in the presence of as much as 800 cubic centimeters of diluent per mole of thiophene; that is to say, in the presence of about 10 volumes of diluent per volume of thiophene. This is illustrated by Table V:

Table V

| Run No. | Vol. diluent per volume of Thiophene | Distillation End Point °C. | Distillation End Point mm. Hg | Still Residue (parts by wt./mole Thiophene) | Softening Point of Residue, °F. | Per Cent S by wt. in Residue |
|---|---|---|---|---|---|---|
| 15 | 10 | 162 | 760 | 98.2 | soft paste | |
| 4 | 2 | 250 | 25 | 150 | 174 | |
| 16 | ¹0 | 250 | 3 | 85.7 | 154 | |
| 12 | ¹0 | 250 | 5 | <44 | hard paste | 5.3 |
| 13 | ¹0 | 250 | 5 | <163 | 232 | 15.1 |

¹ Not comparable; as other changes were made.

In general, the order of the addition of the reactants may be varied. This is manifest from a study of the data collected in Table VI:

Table VI

| Run No. | Order of Addition | Distillation End Point °C. | Distillation End Point mm. Hg | Still Residue (parts by wt./mole Thiophene) | Softening Point of Residue, °F. | Per Cent S by wt. in Residue |
|---|---|---|---|---|---|---|
| 13 | turpentine last | 250 | 3 | 163 | 232 | 15.1 |
| 17 | reactants last | 250 | 3 | 87.5 | 138 | 6.6 |
| 4 | catalyst last | 250 | 25 | 150 | 174 | |

In other words, the catalyst may be added to the mixed reactants and diluent and, generally, it is preferred to do so. However, the reactants may be added to the mixed diluent and catalyst as in run 17 or the hydrocarbon (turpentine) added to the mixture of catalyst and thiophene as in run 13.

The moles of terpene reactant per mole of thiophene reactant in the product can be calculated from the sulfur content of the product by means of the formula:

$$\frac{\text{Moles of terpene reactant}}{1 \text{ mole of thiophene reactant}} = \frac{3200 - M_1 x}{M_2 x}$$

where $x$ is the per cent sulfur by weight in the product, $M_1$ is the molecular weight of the thiophene reactant (84 for thiophene itself) and $M_2$ is the molecular weight of the terpene reactant (136 for $C_{10}H_{16}$ terpenes). Illustrative of the composition of the product of the reaction in terms of moles of turpentine per mole of thiophene reactant are the following:

Table VII

| Run No. | Per Cent S by wt. in Residue | Mole turpentine 1 mole thiophene reactant | Softening Point, °F. |
|---|---|---|---|
| 13 | 15.1 | 0.94 | 232 |
| 10 | 12.4 | 1.3 | 158 |
| 8 | 11. | 1.5 | |
| 1 | 10.4 | 1.6 | 174 |
| 2 | 9.5 | 1.9 | |
| 14 | 9.4 | 1.9 | 174 |
| 5 | 7.7 | 2.4 | 190 |
| 9 | 7.4 | 2.6 | |
| 17 | 6.6 | 2.9 | 138 |
| 18 | 5.7 | 3.4 | |
| 11 | 5.4 | 3.7 | 159 |
| 12 | 5.3 | 3.8 | |
| 6 | 2.2 | 10.1 | 203 |
| 20 | 9.9 | 1.7 | 117 |
| 21 | 3.3 | 5.7 | |

Therefore, the reaction product obtained by reacting thiophene and turpentine in the presence of a catalyst as defined hereinbefore contains about one mole to about 10 moles of turpentine for each mole of thiophene reactant.

A summary of runs in which the variables catalyst, temperature, hydrocarbon, thiophene derivative, reactant ratio, amount of diluent and order of addition of reactants were changed is provided in Table VIII:

was stirred for about one hour and excess boron trifluoride vented. The product was washed with water and neutralized with dilute aqueous sodium hydroxide. The neutralized reaction product

*Table VIII*

| Run No. | Catalyst | | Temperature, degrees C. | | | | Hydrocarbon Reactant | | Thiophene Reactant | | Thiophene Turpentine Ratio | | | | Diluent vol./vol. of Thiophene | | | Order of Addition | | |
|---|---|---|---|---|---|---|---|---|---|---|---|---|---|---|---|---|---|---|---|---|
| | BF₃ | AlCl₃ | −40 | −20 | 20 | 80 | Gum Turp. | Other | C₄H₄S | Other | 1:2 | 1:1 | 2:1 | 3.6:1 | 0 | 2 | 10 | Cat. last | Reacts. last | Turp. last |
| 2 | x | | | | x | | x | | x | | | x | | | | x | | x | | |
| 4 | x | | x | | | | x | | x | | x | | | | | x | | x | | | |
| 10 | x | | x | | | | x | | x | | | x | | | | | | x | x | | |
| 15 | x | | x | | | | | α-pinene | x | | | x | | | | x | | x | | | |
| 9 | x | | x | | | | | | x | | | | x | | | x | | x | | | |
| 11 | x | | x | | | | x | | x | | | x | | | | x | | x | | | |
| 1 | x | | | | | x | x | | x | | | x | | | x | | | x | | | |
| 16 | x | | | x | | | x | | x | | | x | | | | x | | | x | | |
| 6 | | x | | | x | | x | | x | | | x | | | | x | | | x | | |
| 17 | x | | x | | | | x | | x | | | x | | | | x | | | x | | |
| 7 | | x | x | | | | x | | x | | | x | | | | x | | | | | x |
| 5 | | x | | | | x | x | | x | | x | | | | x | | | x | | | |
| 13 | x | | x | | | | x | | x | | x | | | | | x | | x | | | |
| 14 | x | | | | x | | dipentene | | x | | | | x | x | | x | | x | | | |
| 8 | x | | x | | | | x | | x | 3-methyl thiophene | | x | | | | x | | x | | | |
| 12 | x | | | x | | | x | | | 2-methyl thiophene | | x | | | | x | | x | | | |
| 18 | x | | x | | | | x | | | di-t-butyl thiophene | | x | | | | x | | x | | | |
| 20 | x | | x | | | | x | | | | | x | | | | x | | x | | | |
| 21 | x | | x | | | | x | | | | | x | | | | x | | x | | | |

The data collected in Table VIII were obtained from the following illustrative but not limiting examples.

*Example I (run 1)*

About one mole (about 84 parts by weight) of thiophene and about one mole (about 136 parts by weight) of gum terpentine were mixed with about 2 volumes (based on the volume of thiophene) of cyclohexane and heated to 80 degrees centigrade. Boron trifluoride was added until the pressure remained steady at about 10 pounds per square inch. The reaction mixture was stirred for about one hour and excess boron trifluoride vented. Ammonia was added to react with the residual boron trifluoride and form a solid which was removed by filtration. The filtrate was washed with water, cyclohexane or n-pentane and n-butanol being added to facilitate the washing. The washed filtrate was then dried. Any suitable method may be employed for drying the washed filtrate. For example, it may be dried with $CaCl_2$ or similar desiccants. The dried filtrate was then distilled at atmospheric pressure until the pot temperature reached 250 degrees centigrade. Then the distilling flask was cooled and the pressure was reduced to about 3 millimeters of mercury. The distillation was continued until no more distillate was obtained at a pot temperature of 250 degrees centigrade at 3 millimeters of mercury. The residue was a brown brittle solid having a softening point of about 174 degrees Fahrenheit and contained 10.4 per cent sulfur. The sulfur content of the residue corresponds to that of a product containing 1.6 moles of turpentine to each mole of thiophene.

*Example II (run 2)*

About 84 parts by weight (about 1 mole) of thiophene, about 136 parts by weight (about 1 mole) of gum terpentine and about 130 parts by weight (about 2.4 volumes based on the volume of thiophene) of n-pentane were mixed in a pressure resistant container at about 20 degrees centigrade. Boron trifluoride was added slowly with stirring until the pressure was about 10 pounds per square inch (gauge). The reaction mixture was stirred for about one hour and excess boron trifluoride vented. The product was washed with water and neutralized with dilute aqueous sodium hydroxide. The neutralized reaction product was dried. The dried reaction product was vacuum distilled to a pot temperature of 250 degrees centigrade at a pressure of about 280 millimeters of mercury. The still residue contained 9.5 per cent sulfur and had a molecular weight of 527 by the ebullioscopic method. On the basis of the sulfur content of the still residue the product contained 1.86 moles of terpentine to 1 mole of thiophene. On the basis of the molecular weight the product contained 2.92 moles of turpentine or a mole ratio of 1.57 moles of thiophene or a mole ratio of 2.92/1.57=1.86:1. The still residue can be cast into various shapes and can be used as an adhesive and as the film-forming component of varnish.

*Example III (run 4)*

About 84 parts by weight of thiophene, about 136 parts by weight of turpentine and about 130 parts by weight of n-pentane were mixed and cooled to minus 40 degrees centigrade. Boron trifluoride was added slowly with stirring until the pressure reached 10 pounds per square inch gauge. The reaction mixture was stirred for 30 minutes. Excess $BF_3$ was vented and ammonia gas was added in excess to react with the residual $BF_3$. The reaction product was filtered and the filtrate washed with water. Emulsions were formed; n-butanol was used to break these emulsions. The washed product was dried and distilled to a pot temperature of 250 degrees centigrade at 25 millimeters of mercury. The still residue was a clear, red-brown, brittle resin which was soluble in mineral oil. The resin had an A. S. T. M. ring and ball softening point of 174 degrees Fahrenheit.

*Example IV (run 5)*

About 155 parts by weight of cyclohexane and about 10 parts by weight of aluminum chloride were placed in an autoclave at about 80 degrees centigrade and about 220 parts by weight of an equimolar mixture of thiophene and turpentine were pumped in at a rate of about 0.01 liter per minute. The whole was stirred about one hour, cooled to about 30 degrees centigrade about 50 cubic centimeters of methanol were added and the whole was stirred about 10 minutes. The product was separated, washed, neutralized and dried. The washed and dried reaction product was distilled to a pot temperature of about 250 degrees centigrade at 4 millimeters of mercury. The residue was a brown brittle solid containing 7.7 per cent sulfur and having a softening point of about 190 degrees Fahrenheit. The product comprised 2.42 moles of turpentine to one mole of thiophene calculated on the basis of the sulfur content.

*Example V (run 6)*

About 155 parts by weight of cyclohexane and about 10 parts by weight of aluminum chloride were placed in an autoclave at about 20 degrees centigrade and about 220 parts by weight of a mixture of equal moles of thiophene and turpentine were pumped in at about 0.1 liter per minute. The whole was stirred about one hour after completion of the pumping. About 60 parts by weight of methanol were then added and the whole was stirred about 10 minutes. The oil layer was separated and washed with water, n-butanol being added to avoid emulsions. The product was dried with calcium chloride. The dried reaction product was distilled to a pot temperature of 250 degrees centigrade at 4 millimeters of mercury. The still residue was a clear brown brittle solid having a softening point of 203 degrees Fahrenheit and containing 2.2 per cent sulfur. Accordingly, the product comprised about 10.1 moles of turpentine per mole of thiophene.

*Example VI (run 7)*

About 130 parts by weight of n-pentane and about 10 parts by weight of aluminum chloride were placed in an autoclave at about minus 40 degrees centigrade and about 220 parts by weight of a mixture of equal moles of thiophene and turpentine were pumped in at about 0.01 liter per minute. The whole was stirred for about one hour after all of the charge had been pumped in. About 60 parts by weight of methanol were added and the whole was stirred about 10 minutes. The product was separated, washed with water, neutralized, rewashed with water and dried with calcium chloride. The dried reaction product was distilled to 171 degrees centigrade vapor temperature at 760 millimeters of mercury. The still residue was a clear light brown sticky viscous liquid.

*Example VII (run 8)*

About 136 parts by weight (1.0 mole) of dipentene were mixed with about 84 parts by weight of thiophene (1.0 mole) and about 155 parts by weight of cyclohexane at about 20 degrees centigrade. BF$_3$ was added in excess. The whole was stirred about 30 minutes. The excess BF$_3$ was vented and ammonia added to react with remaining BF$_3$. The solid was filtered off and the filtrate was washed with water. The dried reaction product was distilled to a pot temperature of 240 degrees centigrade at 5 millimeters of mercury. The still residue was a clear brown brittle solid having a softening point of about 156 degrees Fahrenheit and containing about 11.1 per cent sulfur. Based upon the sulfur content the still residue comprised about 1.5 moles of turpentine to 1 mole of thiophene.

*Example VIII (run 9)*

About 84 parts by weight of thiophene and about 136 parts by weight of alpha-pinene were mixed with about 130 parts by weight of n-pentane and the whole was cooled to about minus 40 degrees centigrade. BF$_3$ was added in excess and the whole stirred about 30 minutes. The excess BF$_3$ was vented off and the remaining BF$_3$ reacted with ammonia. The solid material was filtered off on a Buchner funnel and the filtrate was washed with water and dried with calcium chloride. The dried reaction product was distilled to a pot temperature of about 250 degrees centigrade at 4 millimeters of mercury. The still residue was a dark brown paste containing about 7.4 per cent sulfur. The calculated α-pinene to thiophene molar ratio is 2.6:1.

*Example IX (run 10)*

About 63 parts by weight of thiophene (0.75 mole), about 204 parts by weight turpentine (1.5 moles) and about 130 parts by weight n-pentane were mixed. At about minus 40 degrees centigrade BF$_3$ was added in excess and the whole was stirred about 30 minutes. The excess BF$_3$ was vented off and ammonia was added to react with the remaining BF$_3$. The solid compound of BF$_3$ and NH$_3$ was filtered off and the filtrate was washed with water and dried with calcium chloride. The dried reaction product was distilled to a pot temperature of about 250 degrees centigrade at 2 millimeters of mercury. The material boiling below 250 degrees centigrade at 4 millimeters of mercury contained about 6.91 per cent sulfur, had a bromine number of 91.8, a kinematic viscosity of 25.83 centistokes at 100 degrees Fahrenheit and 3.70 centistokes at 210 degrees Fahrenheit and a specific gravity at 60 degrees Fahrenheit of 0.982. The still residue had a molecular weight of 562 and contained about 12.4 per cent sulfur equivalent to a molar ratio of 1.28 moles turpentine to one mole of thiophene. The still residue was soluble in mineral oil of the lubricating grade.

*Example X (run 11)*

About 126 parts by weight of thiophene (1.5 moles), about 102 parts by weight of turpentine (0.75 mole) and about 130 parts by weight of n-pentane were mixed at about minus 40 degrees centigrade. BF$_3$ was added in excess and the whole stirred for about 30 minutes. The excess BF$_3$ was vented and ammonia added to react with remaining BF$_3$. The solid was filtered off and the filtrate was washed with water and dried with calcium chloride. The dried reaction product was distilled to a pot temperature of 250 degrees centigrade at 3.5 millimeters of mercury. The still residue had a softening point of about 159 degrees Fahrenheit and contained about 5.4 per cent sulfur corresponding to a turpentine to thiophene molar ratio of 3.7:1.

*Example XI (run 12)*

About 150 parts by weight of thiophene (1.8 moles) and about 68 parts by weight of turpentine (0.5 mole) were mixed at about minus 40 degrees centigrade and BF$_3$ was added in excess. The whole was stirred for about one hour. The excess BF$_3$ was vented and ammonia was added to react with remaining BF$_3$. The product was filtered. It was heavier than water and was diluted with n-pentane until lighter than water. The product was washed with water and dried with calcium chloride. The dried product was distilled to a pot temperature of 250 degrees centigrade at 5 millimeters of mercury. The still residue was soft and a pointed rod easily could be pushed into it. Thin strands of the still residue were brittle. The still residue contained about 5.3 per cent sulfur equivalent to a ratio of about 3.8 moles of turpentine to about 1 mole of thiophene.

*Example XII (run 13)*

About 168 parts by weight of thiophene (about 2 moles) were placed in an autoclave at about minus 40 degrees centigrade and BF₃ was added until the gage pressure was about 20 pounds per square inch. About 136 parts by weight of turpentine (about 1 mole) were pumped in at about 0.01 liter per minute. The whole was then stirred for about one hour. The product was diluted with cyclohexane, washed with water, neutralized with dilute ammonia water and rewashed with water. N-butanol was used to avoid emulsions. The product was dried with calcium chloride. It was a clear red by transmitted light and had a slight green tint by reflected light. The dried product was distilled to a pot temperature of 250 degrees centigrade at a pressure of about 3 millimeters of mercury. The still residue was a clear, brown brittle solid softening at about 232 degrees Fahrenheit and containing about 15.1 per cent sulfur corresponding to a turpentine to thiophene ratio of 0.94 mole to 1 mole.

*Example XIII (run 14)*

About 84 parts by weight of thiophene (1.0 mole), about 272 parts by weight of turpentine (2.0 moles) and about 155 parts by weight of cyclohexane were mixed at about 20 degrees centigrade and BF₃ was added in excess. The whole was stirred about 30 minutes. The excess BF₃ was vented and ammonia was added to react with remaining BF₃. The product was washed with water and dried with calcium chloride. Petroleum ether and n-butanol were added to facilitate handling and avoid emulsions. The dried reaction product was distilled to a pot temperature of about 240 degrees centigrade at 5 millimeters of mercury. The still residue was a clear, brown brittle solid having a softening point of about 174 degrees Fahrenheit and containing 9.4 per cent sulfur corresponding to a turpentine to thiophene molar ratio of 1.9:1.

*Example XIV (run 15)*

About 42 parts by weight of thiophene (0.5 mole) and about 68 parts by weight of turpentine (0.5 mole) were mixed with about 260 parts by weight of n-pentane. At about minus 40 degrees centigrade BF₃ was added in excess and the whole was stirred for about 30 minutes. The excess BF₃ was vented off and ammonia was added to react with the remaining BF₃. The solid was filtered off and the filtrate was washed with water, dried and distilled. The dried reaction product was distilled to a vapor temperature of about 162 degrees centigrade at about 760 millimeters of mercury. The still residue was an opaque, cloudy, brown viscous mass soluble in mineral oil.

*Example XV (run 16)*

About 84 parts by weight of thiophene and about 136 parts by weight of turpentine were mixed at about minus 20 degrees centigrade. No diluent was used. BF₃ was added in excess and the whole was stirred for about 30 minutes. The excess BF₃ was vented off and ammonia was added to react with remaining BF₃. The product was readily poured from the autoclave. Cyclohexane was added and the product was filtered, washed with water and dried with calcium chloride. The dried reaction product was distilled to a pot temperature of about 250 degrees centigrade at 3 millimeters of mercury. The still residue had a softening point of about 154 degrees Fahrenheit.

*Example XVI (run 17)*

About 200 cubic centimeters of hydrocarbon diluent were placed in a 900 cubic centimeters autoclave at about minus 40 degrees centigrade and BF₃ was added until the gas pressure was 20 pounds per square inch. About 238 cubic centimeters of a mixture of equal moles of thiophene and turpentine were pumped in at about 10 cubic centimeter per minute. More BF₃ was added to maintain a pressure of about 25 pounds per square inch. The whole was stirred for about one hour. The BF₃ gas was vented and ammonia was added to react with remaining BF₃. The solid was filtered off and the filtrate was washed with water, n-butanol being added to avoid emulsions. The dried reaction product was distilled to a pot temperature of about 250 degrees centigrade at 3 millimeters of mercury. The still residue was brown, clear and soft. A pointed rod could be pushed into it readily. The still residue had a softening point of about 138 degrees Fahrenheit and contained about 6.6 per cent sulfur corresponding to a turpentine to thiophene molar ratio of about 2.95:1.

*Example XVII (run 18)*

About 48 parts by weight of 3-methyl thiophene (0.5 mole) were mixed with about 68 parts by weight of turpentine (0.5 mole) and about 68 parts by weight of n-pentane at about minus 40 degrees centigrade. BF₃ was added in excess and the whole was stirred for about one hour. The excess BF₃ was vented off and ammonia was added to react with remaining BF₃. The solid product was filtered off and the filtrate was washed with water and dried with calcium chloride. The dried reaction product was distilled to a pot temperature of about 250 degrees centigrade at 4 millimeters of mercury. The still residue was a clear, brown brittle solid and contained about 5.7 per cent sulfur corresponding to a turpentine to thiophene molar ratio of about 3.4 to 1.

*Example XVIII (run 20)*

About 49 parts by weight of 2-methyl thiophene (0.5 mole) were mixed with about 68 parts by weight of turpentine (0.5 mole) and about 68 parts by weight of normal pentane at about minus 40 degrees centigrade. Boron trifluoride gas was added in excess and the whole was stirred for about one hour. The excess BF₃ was vented off and ammonia gas was added to react with remaining BF₃. The liquid product was decanted off, washed with water and dried with calcium chloride. The dried reaction product was distilled to a pot temperature of about 250 degrees centigrade at a pressure of 5 millimeters of mercury. The still residue was a clear, brown solid with a softening point of 117 degrees Fahrenheit. It contained about 9.9 per cent sulfur corresponding to a turpentine : 2-methyl thiophene molar ratio of about 1.7 to 1.

*EXAMPLE XIX (run 21)*

About 98 parts by weight of di-t-butylthiophene (0.5 mole) were mixed with about 68 parts by weight of turpentine (0.5 mole) and about 68 parts by weight of normal pentane at about minus 40 degrees centigrade. Boron trifluoride gas was added in excess and the whole was stirred for about one hour. The excess boron trifluoride was vented off. The liquid product was washed and neutralized with dilute ammonia water, washed further with water and dried with calcium chloride. The dried reaction product was distilled to a pot temperature of 250 degrees centigrade at a pressure of 5 millimeters of mercury. The still residue was a clear brown brittle solid with a softening point of 147 degrees Fahrenheit. It contained about 3.3 per cent sulfur corresponding to a turpentine : di-t-butylthiophene molar ratio of about 5.7 to 1.

As has been pointed out hereinbefore, the resinous materials produced as described hereinbefore may be used as varnish components, as adhesives and as additives for lubricating oils. Exemplary of the use as a varnish component is the following:

Five parts by weight of a pinene-thiophene resinous material was mixed with 10 parts by weight of bodied linseed oil and the mixture heated to 540 to 580 degrees Fahrenheit for 20 to 30 minutes. The mixture jelled somewhat. Thereafter about one to about 2 grams of a mixture of metal naphthenates was added as an accelerator and a satisfactory coating on a glass panel was obtained. The foregoing proved that the resinous materials obtained as described hereinbefore are compatible with conventional constituents of varnishes and are satisfactory varnish components.

Although the present invention has been described in conjunction with certain specific embodiments thereof, those skilled in the art will understand that variations and modifications can be made within the scope of the claims. Thus, the phrase "thiophene derivatives having at least two replaceable nuclear hydrogens" will be understood to include alkyl substituted thiophene and thiophenes having such nuclear substituent groups as —OH, —OR, —NH$_2$, NHCOCH$_3$, —SH, —SR, —COOH, —COOR, —CHO, —COR (especially —COCH$_3$) and —CONH$_2$ as well as those in which alkyl groups having these same oxygen, sulfur or nitrogen containing substituent groups are attached to the thiophene nuclene as, for example, —[(CH$_2$)$_n$OH] or —[(CH$_2$)$_n$CONH$_2$].

We claim:

1. A method for preparing sub-resinous and resinous bodies which comprises reacting a thiophene having at least two hydrogens of the thiophene nucleus replaceable and a terpene in the ratio of about 0.5 to about 4 moles of said thiophene to one mole of said terpene in the presence of a Friedel-Crafts type catalyst.

2. The method as set forth and described in claim 1 wherein the essential component of the catalyst is boron trifluoride.

3. The method as set forth and described in claim 1 wherein the catalyst is aluminum chloride.

4. The method as set forth and described in claim 1 wherein the catalyst is aluminum chloride and the reaction temperature is about 20 to about 80° C.

5. The method as set forth and described in claim 1 wherein the essential component of the catalyst is boron trifluoride and the reaction temperature is about minus 40 to about 80° C.

6. A novel composition of matter consisting of the reaction product obtained by reacting about 0.5 to about 4 moles of a thiophene having two hydrogen atoms of the thiophene nucleus replaceable and one mole of turpentine in the presence of a Friedel-Crafts type catalyst; said reaction product containing 2.2 to about 15 weight per cent sulfur and 0.94 mole to 10.1 moles of turpentine per mole of thiophene reactant.

7. A novel composition of matter consisting of a reaction product obtained by reacting equimolecular proportions of thiophene and dipentene in the presence of boron trifluoride, said composition of matter having an initial boiling point about 240° C. at a pressure of 5 millimeters of mercury, being a solid having a softening point of about 156° F. and containing about 11 per cent sulfur.

8. A novel composition of matter consisting of a reaction product obtained by reacting equimolecular proportions of thiophene and alpha pinene in the presence of boron trifluoride, said reaction product being a paste having an initial boiling point above 250° C. at a pressure of 4 millimeters of mercury and containing about 7.4 per cent by weight of sulfur.

9. A novel composition of matter consisting of a reaction product obtained by reacting thiophene and turpentine in the proportion of 0.5 to 4 moles of thiophene to 1 mole of turpentine in the presence of Friedel-Crafts type catalyst, said reaction product having an initial boiling point above 250° C. at a pressure of 25 millimeters of mercury and a softening point of about 138°–232° F.

10. A novel composition of matter consisting of the reaction product obtained by reacting thiophene and turpentine in equi-molecular proportions in the resence of aluminum trichloride, said reaction product having an initial boiling point above 171° C. at a pressure of 760 millimeters of mercury and being a clear sticky viscous liquid.

GEORGE C. JOHNSON.

REFERENCES CITED

The following references are of record in the file of this patent:

UNITED STATES PATENTS

| Number | Name | Date |
|---|---|---|
| 1,939,932 | Thomas | Dec. 19, 1933 |
| 2,287,535 | Powers | June 23, 1942 |
| 2,349,210 | Traylor | May 16, 1944 |
| 2,424,691 | Hansford | July 29, 1947 |

OTHER REFERENCES

Heusler: Zeitshrift für Angewandte Chemie, vol. 10, pages 288–292: 318–321.

Certificate of Correction

Patent No. 2,490,270 December 6, 1949

GEORGE C. JOHNSON

It is hereby certified that errors appear in the printed specification of the above numbered patent requiring correction as follows:

Column 2, line 47, for the words "manner and" read *manner, say*; column 5, Table IV, fifth column thereof, for "<204" read *204*; column 13, line 46, for "nuclene" read *nucleus*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*